US005462425A

United States Patent [19]

Kuss et al.

[11] Patent Number: 5,462,425

[45] Date of Patent: Oct. 31, 1995

[54] APPARATUS FOR DEMOISTURIZING COAL

[76] Inventors: Thomas Kuss, 2382 Watergap Rd.; Donald L. Horn, P.O. Box 696, both of Prestonsburg, Ky. 41653

[21] Appl. No.: 272,833

[22] Filed: Jul. 11, 1994

[51] Int. Cl.$^{6}$ .............................. B29C 43/08; B30B 9/20; B30B 11/22; B30B 15/02

[52] U.S. Cl. .......................... 425/183; 100/116; 100/121; 100/131; 100/178; 100/907; 425/193; 425/195; 425/197; 425/350; 425/351; 425/236; 425/237

[58] Field of Search .............................. 425/86, 197, 198, 425/236, 237, 347, 348 R, 350, 351, 359–361, 193, 358, 183, 186, 195; 100/116, 121, 126, 131, 177, 178, 161, 110, 130, 907

[56] References Cited

U.S. PATENT DOCUMENTS

| | | | |
|---|---|---|---|
| 57,303 | 8/1866 | Emery . | |
| 492,206 | 2/1893 | Hunter et al. . | |
| 614,200 | 11/1898 | Cobb . | |
| 874,167 | 3/1907 | Crow | 425/237 |
| 958,068 | 5/1910 | Arbuckle . | |
| 994,495 | 6/1911 | Berrigan . | |
| 1,625,649 | 4/1927 | Gottfried | 425/348 |
| 2,181,737 | 11/1939 | North | 425/237 |
| 2,366,475 | 1/1945 | Bartholomew | 425/236 |
| 2,445,742 | 7/1948 | Hoch | 425/350 |
| 2,528,533 | 11/1950 | McCulloch | 100/178 |
| 2,958,902 | 11/1960 | Decker et al. . | |
| 3,166,468 | 1/1965 | Daniele et al. | 425/350 |
| 3,741,388 | 6/1973 | Takahashi . | |
| 3,907,485 | 9/1975 | Komarek . | |
| 4,081,229 | 3/1978 | Moore | 425/237 |
| 4,436,028 | 3/1984 | Wilder | 100/121 |
| 4,919,824 | 4/1990 | Creps et al. . | |
| 5,236,596 | 8/1993 | Greenwald, Sr. . | |
| 5,273,512 | 12/1993 | Ducasse | 100/121 |
| 5,349,901 | 8/1994 | Brittain et al. | 100/121 |

*Primary Examiner*—Khanh P. Nguyen
*Attorney, Agent, or Firm*—Richard C. Litman

[57] ABSTRACT

An apparatus for mechanically separating water from coal includes a vibrating hopper, two contra-rotating cylinders, a solid collector, and a fluid collector. The hopper feeds hydrated coal or coal slurry to wells which are arranged along the surface of a first rotating cylinder. A second rotating cylinder has protrusions on its surface which are precisely placed such that when the first and second cylinders are brought in contact and rotated in contra-rotating directions, each of the wells of the first cylinder and a corresponding protrusion of the second cylinder form mating female and male dies. Coal in the female dies is pressed, and the moisture in the coal is squeezed out. The coal remaining in the dies is then delivered to the solid collector via a pusher. The distance between the cylinders may be varied through adjustable cylinder bearings or pillow blocks. Both the male and female dies may be removed and replaced. The dies may be adjustable relative to one another to vary the penetration of the male dies relative to respective female dies. Since water is not compressible, it is force out of the female dies between the engaging male and female dies. Although water is permitted to escape from between the engaging male and female dies, only a nominal amount of coal is permitted to escape. Subsequent to permitting water to escape, pressure between the dies is increased greatly to produce a solid from the coal mixture.

22 Claims, 4 Drawing Sheets

FIG. 2
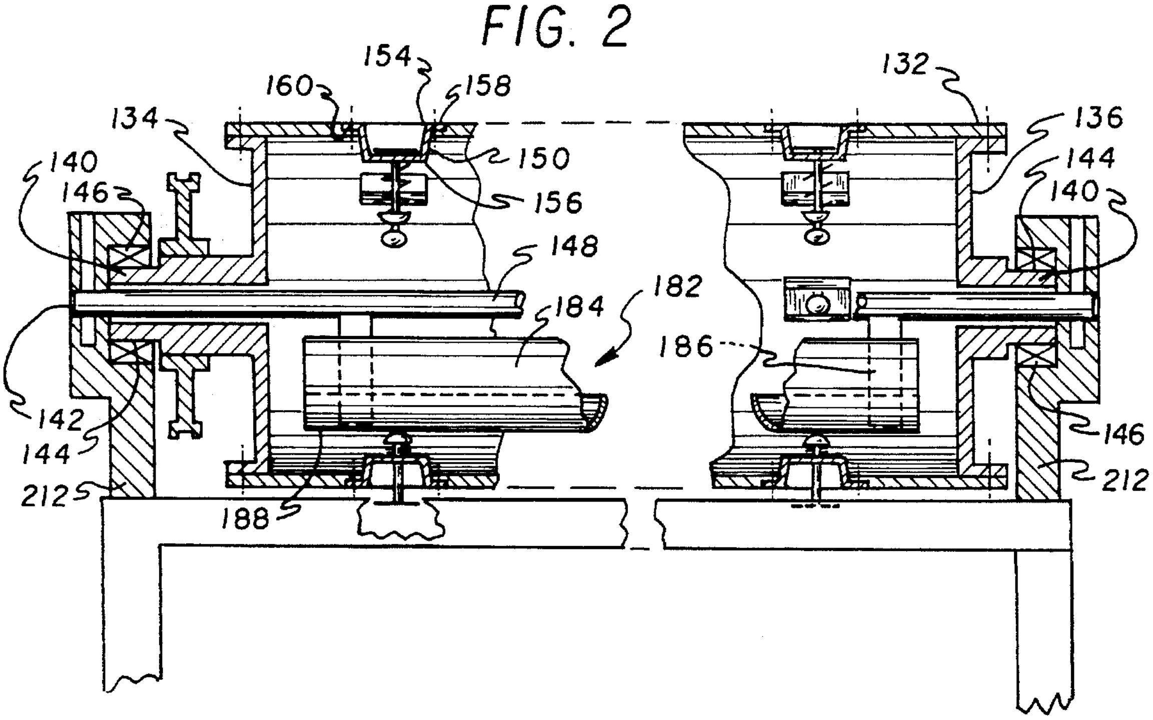
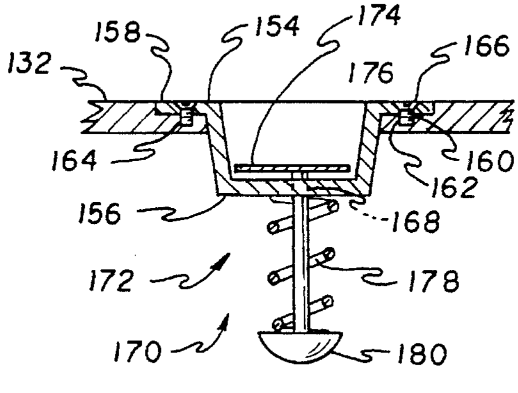
FIG. 3

FIG. 5
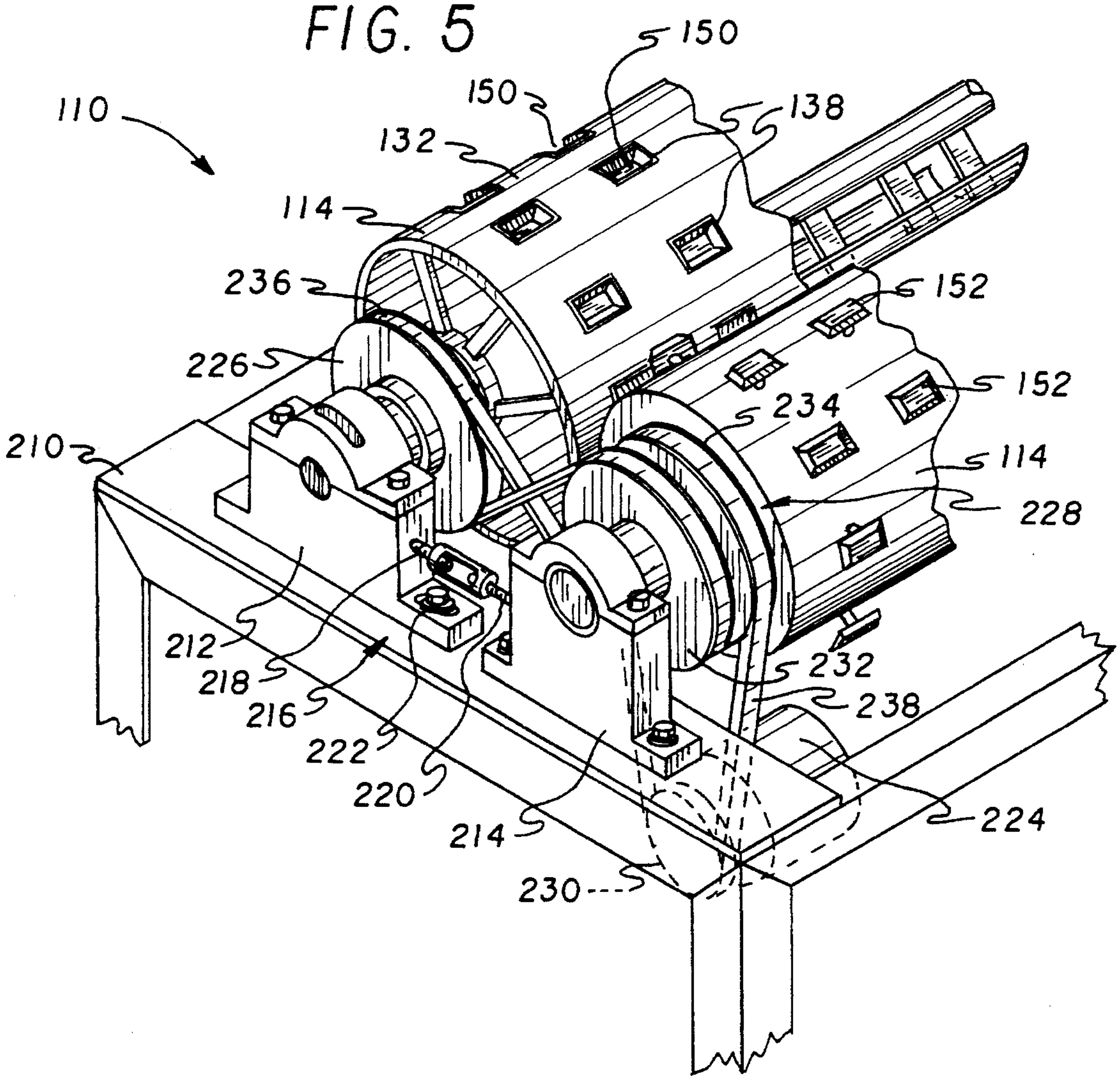
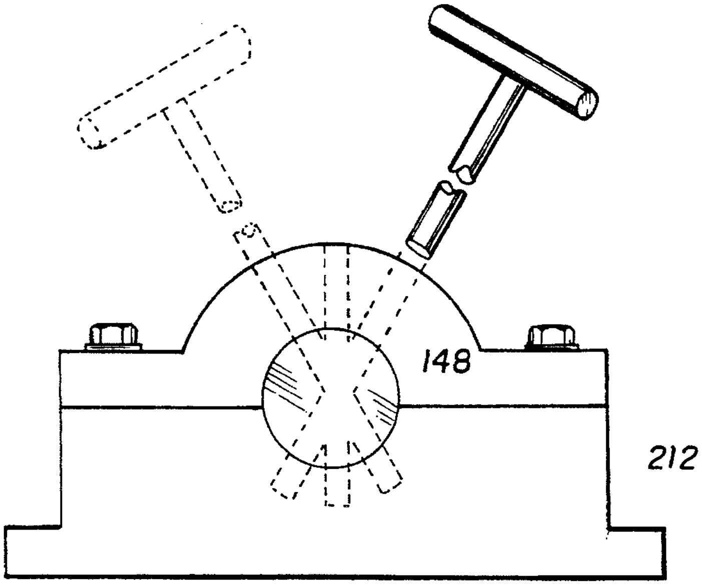
FIG. 6

APPARATUS FOR DEMOISTURIZING COAL

BACKGROUND OF THE INVENTION

1. Field of the Invention

The present invention relates to apparatus for demoisturizing coal and more particularly, to an apparatus for mechanically separating water from coal fines.

2. Description of the Prior Art

The mechanical extraction of water using opposingly rotating rollers has been the subject of earlier patents. For example, U.S. Pat. No. 4,919,824, issued Apr. 24, 1990 to John L. Creps et al., discloses methods and an apparatus for deliquifying solids. The apparatus includes a vibrating inlet chute, a pair of contra-rotating rollers, and separate liquid and solid collection areas. One of the rollers may have slots along its surface, allowing water to drain to the center of the roller. In operation, this device requires a deliquified solid product to be scraped off the outlet surfaces of the rollers. This patent does not teach the use of one roller as a delivery vehicle to the compression zone, nor does it teach the use of mated compression dyes. Further, this device is not specifically adapted for water removal from coal or coal slurry. U.S. Pat. No. 958,068, issued May 7, 1910 to Alessander J. Arbuckle, discloses another apparatus for separating solid matter from liquids. This apparatus utilizes pressure generated between two contra-rotating rollers. Rather than squeezing liquid out of the solid, the rollers here deliver solids from a settling hopper.

Solids have been mechanically separated from slurries, including coal slurries, using continuous filter belt presses. Though many of these presses feature rollers to apply pressure, the main mechanism for separation is a belt having a porous structure sufficient to allow water to drain therethrough while holding solid matter. U.S. Pat. No. 3,741,388, issued Jun. 26, 1973 to Kenji Takahashi, and No. 5,236,596, issued Aug. 17, 1993 to Edward Greenwald, Sr., are examples of such devices. U.S. Pat. No. 994,495, issued Jun. 6, 1911 to John J. Berrigan, discloses a continuous belt device which features wells in the belt and protrusions on a compressive roller.

The use of wells or dies in compressive rotary members is known in the briquetting field. Though not expressly for the separation of liquids from solids, some dewatering is known to be the result of their use. The majority of these devices include removable female dies on both rollers, such as that shown in U.S. Pat. No. 2,958,902, issued Nov. 8, 1960 to Johannes B. Decker et al., and No. 3,907,485, issued Sep. 23, 1975 to Karl R. Komarek. A device for creating molded articles which includes mating male and female dies on opposing rollers is disclosed by Marshall E. Hunter et al., in U.S. Pat. No. 492,206, issued Feb. 21, 1893. Hydraulic systems used for ejecting compressed articles is disclosed by U.S. Pat. No. 57,303, issued Aug. 21, 1866 to A. H. Emery.

None of the above inventions and patents, taken either singly or in combination, is seen to describe the instant invention as claimed.

SUMMARY OF THE INVENTION

The present invention relates to an apparatus for mechanically separating water from coal fines. The apparatus includes a vibrating hopper, two contra-rotating cylinders, a solid collector, and a fluid collector. The hopper feeds hydrated coal fines or a coal slurry to wells which are arranged along the surface of a first rotating cylinder. A second rotating cylinder has protrusions on its surface which are precisely placed such that when the first and second cylinders are brought in contact with one another and rotated in contra-rotating directions, each of the wells of the first cylinder and a corresponding protrusion of the second cylinder form mating female and male dies. Coal in the female dies is pressed, and the moisture in the coal is squeezed out and collected by the fluid collector. The coal remaining in the dies is then delivered to the solid collector through a pusher assembly. The distance between the cylinders may be varied through adjustable cylinder bearings. Both the male and female dies may be removed and replaced.

Accordingly, it is a principal object of the invention to provide an apparatus for mechanically separating water from coal fines wherein the apparatus includes two meshingly engageable contra-rotating cylinders.

Another object is that the apparatus further include an infeed hopper, a solid collector, and a fluid collector, wherein the infeed hopper includes a vibrating mechanism for ensuring that an even flow of incoming coal mixture is maintained, and wherein the solid and fluid collectors are structured and configured so as not to communicate with one another.

It is another object that the contra-rotating cylinders include a first cylinder and that the infeed hopper feed hydrated coal or a coal slurry to wells which are arranged along the surface of the first rotating cylinder.

It is yet another object that the contra-rotating cylinders further include a second cylinder and that the second rotating cylinder have protrusions on its surface which are precisely placed such that when the first and second cylinder are brought in contact with one another and rotated in contra-rotating directions, each of the wells of the first cylinder and a corresponding protrusion of the second cylinder form mating female and male dies.

Yet another object is that upon pressing the coal in the female dies, moisture in the coal be squeezed out and collected by the fluid collector, and subsequently, that the coal remaining in the dies be delivered to the solid collector through a pusher assembly.

Still another object is that the pinch, or the distance between the cylinders, be variable, such as through adjustable cylinder bearings or adjustable dies.

Another object is that both the male and female dies be removable and replaceable.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 2 is cross-sectional view of the first roller supported by a supporting structure.

FIG. 3 is cross-sectional view of a female die recessed within the cylindrical surface of the first roller and having a pusher assembly attached thereto.

FIG. 5 is a partial front perspective view of the apparatus shown in FIG. 1.

FIG. 6 is a largely diagrammatic end view of a pillow block, taken from the upper left portion of FIG. 5, and drawn to an enlarged scale.

Similar reference characters denote corresponding features consistently throughout the attached drawings.

DETAILED DESCRIPTION OF THE PREFERRED EMBODIMENT

Figure 1:
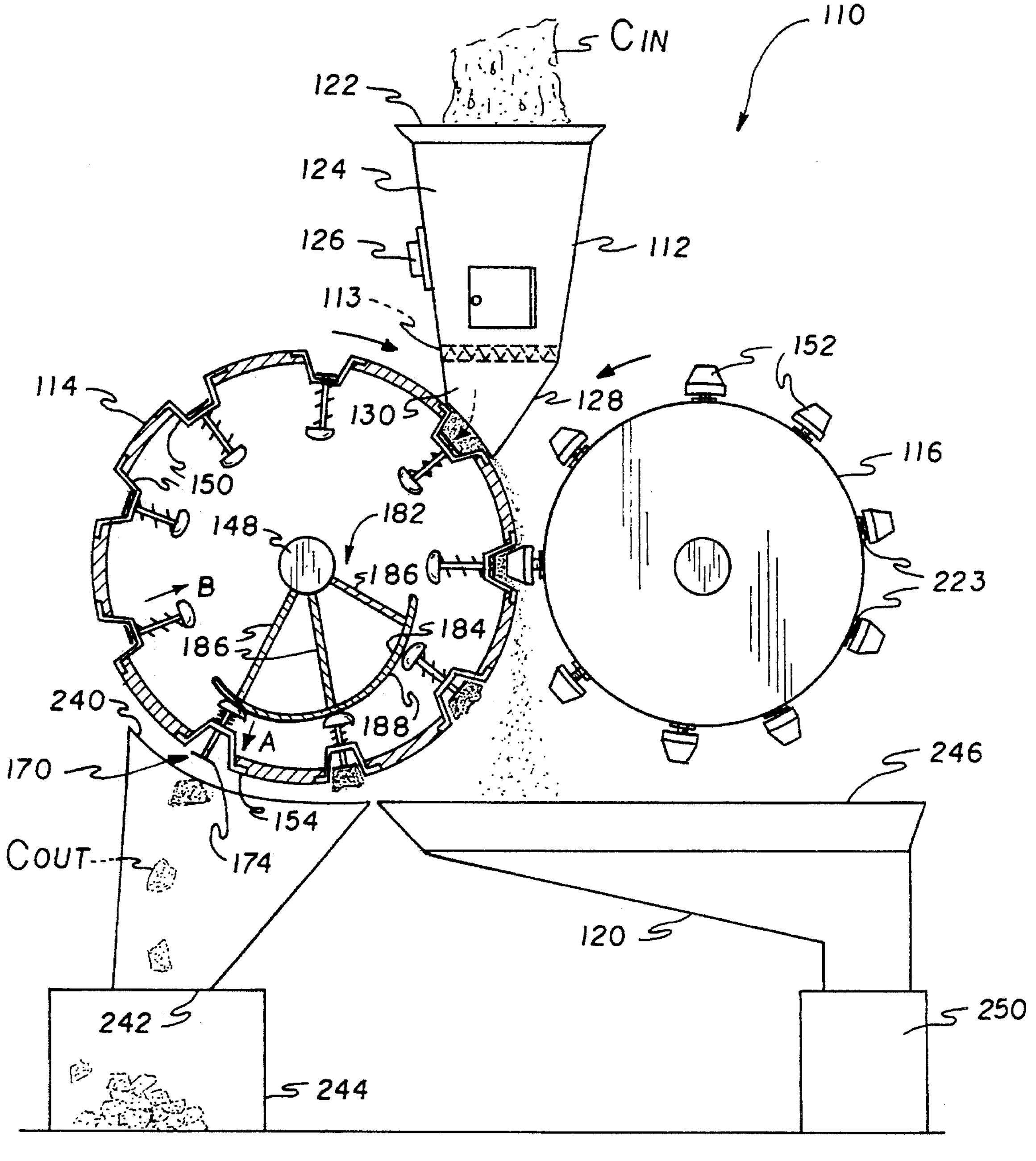
FIG. 1 is an environmental diagrammatic representation of an apparatus for extracting moisture from a hydrated coal or coal slurry.

The present invention, as shown in FIG. 1, is an apparatus 110 for mechanically extracting moisture from a source $C_{In}$, such as a wet agglomerate of coal or a coal slurry, and for producing a substantially demoisturized and/or compressed product $C_{Out}$, such as a substantially demoisturized and/or compressed coal, from the same. The apparatus 110 basically includes a hopper 112, a pair of meshingly engageable, rotatable cylinders or rollers 114, 116, a solid collector or collector chute 118, and a liquid collector or slop catcher 120. Following is a detailed description of each of these components and their interrelationship with one another.

Beginning with the hopper 112, an infeed end 122 is provided for receiving a source of coal of a substantial moisture content $C_{In}$ therethrough. The infeed end 122 communicates with a major portion 124 of the hopper 112. The major portion 124 of the hopper is configured to retain the incoming coal mixture $C_{In}$ therein. The coal mixture $C_{In}$ retained in the major portion 124 of the hopper 112 is preferably continuously agitated by a vibratory device 126 to ensure that an even flow of the coal mixture $C_{In}$ is maintained. The vibrator device 126 may be in the form of a mechanical or an electromechanical high frequency agitator comprising a small displacement mechanism. A discharge chute 128 stems downwardly from the majority portion 124 of the hopper 112. Coal mixture $C_{In}$ retained in the major portion 124 of the hopper 112 is funneled through the discharge chute 128 to a discharge end 130 where the incoming coal mixture $C_{In}$ is discharged. The discharge end 130 has a shape complementary to one of the pairs of rollers 114, 116 for reasons which are to be disclosed hereinafter. It should be noted that the hopper 112 is structured and configured to permit the incoming hydrated coal $C_{In}$ to flow therethrough by the influence of gravitational force. If necessary, that is, under conditions where the coal mixture $C_{In}$ is of a greater concentration, supplemental devices, such as worm drives and the like, may be employed to encourage the migration of the coal mixture $C_{In}$ through the hopper 112.

A screen or grate 113 is preferably provided in or about the hopper 112 for use in sifting or straining large solids, e.g. rocks, clumps of coal, etc. The grate 113 is configured to prevent the large solids from passing through the hopper 112 and reaching the rollers 114, 116. More particularly, the grate 113 is intended to reduce the risk of the large solids encountering and causing damage to the dies 150, 152. The hopper 112 may further be provided with the access to the grate 113, such as the door shown in FIG. 1, to permit the grate 113 to be cleared periodically.

The pair of rollers 114, 116 comprises a first roller 114 and a second roller 116. As shown in FIG. 2, the first roller 114 is preferably a hollow roller bounded by a substantial cylindrical wall 132, a first end 134, a second end 136 opposite the first end 134, and a substantially symmetrical array of openings 138 therein.

The ends 134, 136 of the first roller 114 are each configured to include a hub 140 comprising an inner bore 142 and an outer bearing surface 144. The inner bore 142 is dimensioned to provide sufficient clearance for the passage of a rod 148 through the first roller 114 and thus, permit the first roller 114 to rotate about the rod 148. The outer bearing surface 144 supports an outer bearing 146.

Although the ends 134, 136 of the first roller 114 are structured to support an outer bearing 146, it is preferable that the ends 134, 136 be at least partially open so as to permit access to the rear end 156 of the females dies 150. In this way, removal of the female dies 150 may be effected by applying force to the rear end 156 of the females dies 150 from within the first roller 114 to urge the female dies 150 from respective recesses 160.

Each of the openings 138 in the cylindrical wall 132 is configured to receive a female die or well 150. The wells 150 preferably mount flush with the cylindrical wall 132 of the first roller 114 so as to not interfere with the movement of the first roller 114 relative to the second roller 116. It is also preferable that the wells 150 be releasably fastenable to the cylindrical wall 132 so as to be replaceable when worn. The shape of the well 150 is complementary to that of a male die 152, such as the male die shown in FIGS. 1, 4, and 5, for reasons which will be disclosed hereinafter.

As is clearly shown in FIG. 3, each well 150 includes a forward end 154 and a rear end 156. The forward end 154 has a peripheral flange 158 which seats flush in a respective recess 160 in the cylindrical wall 132 of the first roller 114. Apertures 162 are provided in the flange 158 which align with threaded apertures 164 in the recess 160 in the cylindrical wall 132. The apertures 162, 164 receive threaded fasteners 166 which affix the well 150 to the roller 114. It is preferable that the threaded fasteners 166 be countersunk so as to be flush with the surface of the flange 158.

An ejection mechanism comprises a pusher assembly 170 and an actuating assembly 182. The rear end 156 of the well 150 has a bore 168 passing therethrough. The pusher assembly 170 movably passes through the bore 168. The pusher assembly 170 includes a main body 172 having a head 174 and a rod 176 extending from the head 174. The head 174 has a shape which substantially conforms to the interior of the rear end 156 of the well 150. The rod 176 slidably passes through the bore 168. A portion of the rod 176 extending exteriorly of the rear end 156 of the well 150 carries a biasing element or spring 178. The spring 178 is held on the rod 176 at a location adjacent to the rear end 156 of the well 150 by a retaining element 180. The main body 172 is operable to slide axially through the bore 168 in a first direction A from an initial position, as shown in FIG. 1, while simultaneously compressing the spring 178. The spring 178 subsequently urges the main body 172 in a second direction B opposite to the first direction A, returning the main body 172 of the pusher assembly 170 to the initial position.

The pusher assembly 170 is operable via the actuating assembly 182 extending radially from the rod 148 passing through the first roller 114. As shown in FIGS. 1, 2, and 5, the actuating assembly 182 comprises an elongated arcuate shaped sled or foot 184 and one or more connecting elements 186 for adjoining the sled 184 in a spaced relation and substantially parallel to the rod 148. The sled 184 includes a camming surface 188. As the first roller 114 rotates about the rod 148, the camming surface 188 makes an initial contact with the head 174 of a pusher assembly 170. Due to the placement of the arcuate shape sled 184 relative to the curvature of the first roller 114, as the roller 114 continues to rotate, the sled 184 converges upon the rear end 156 of the well 150, pushing against the head 174 of the pusher assembly 170 and, in turn, the main body 172 in the first direction A from the initial position.

Figure 4:
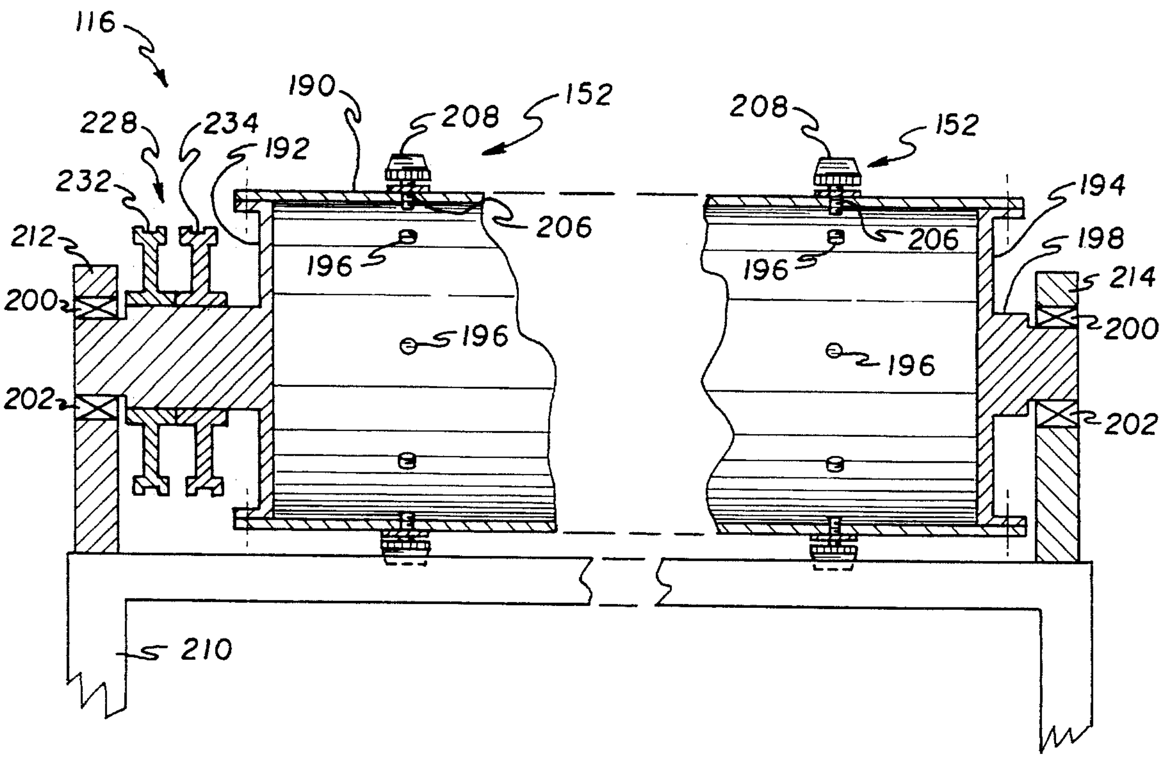
FIG. 4 is cross-sectional view of the second roller supported by a supporting structure.

Similar to the first roller 114, the second roller 116, as shown in FIG. 4, includes a substantially cylindrical outer surface 190, a first end 192, a second end 194 opposite the first end 192, and a substantially symmetrical array of threaded bores 196 therein. The ends 192, 194 of the second roller 116 likewise are each configured to include a hub 198 comprising an outer bearing surface 200. The outer bearing surface 200 supports an outer bearing 202.

Each of the bores 196 in the outer surface 190 are configured to receive a male die or piston 152. The pistons 152 engage the outer surface 190 of the second roller 116 so as not to interfere with the movement of the first roller 114. Similar to that of the wells 150, it is preferable that the pistons 152 be releasably engageable with outer surface 190 of the second roller 116 to permit the pistons 152 to replaced when worn. Each piston 152, more specifically, comprises an externally threaded connecting rod 206 and a piston head 208, such as that shown in the drawings. The piston heads 208 are matingly engageable with the wells 150. Because the shape of the pistons heads 208 is complementary to that of the wells 150, the pistons heads 208 substantially fill the volume of the wells 150 upon full engagement therewith.

The mating engagement of the pistons 152 and wells 150, and more generally, of the rollers 114, 116, will be more clearly understood with the following description and with reference to FIGS. 1 and 5. The first and second rollers 114, 116 are rotatably supported by a support structure 210, such as the table shown in the drawings. The table 210 has attached thereto a first set of pillow blocks 212 and a second set of pillow blocks 214. Pillow blocks of the first set 212 align with corresponding pillow blocks of the second set 214 along a lateral axis.

The first set of pillow blocks 212 receives the outer bearing 146, as shown in FIG. 2, to rotatably support the first roller 112 and includes a keyed journal for receiving the rod 148 to fixedly support the rod 148 relative to the first roller 114. Alternatively, the rod 148 may be rotatably adjustable relative to the first roller 114 and subsequently, fixed relative to the first roller 114, as is shown in FIG. 6. This would permit the actuating assembly 182 to engage the female dies 150 at a desired one of a variety of points of contact.

The second set of pillow blocks 214, as shown in FIG. 4, receives the outer bearing 202 to rotatably support the second roller 116. The rollers 114, 116 are supported in a spaced relationship relative to one another and in a manner such that the longitudinal axes defined by each respective roller 114, 116 lie in planes parallel to one another.

Referring back to FIG. 5, it is preferable that adjustable bearings be provided and more particularly, that the pillow blocks 212, 214 be slidably attached to the table 210 and that the same be adjoined to one another with an adjustable connecting assembly 216, such as the turnbuckle configuration shown. The turnbuckle configuration 216 includes a first threaded rod 218 extending from each one of the pillow blocks of the first set 212 and a second threaded rod 220 extending from each one of the pillow blocks of the second set 214. The threaded rods 218 of the first set of pillow blocks 212 are connected to corresponding threaded rods 220 of the second set of pillow blocks 214 by a turnbuckle 222. By adjusting the turnbuckle configuration 216, the spacial relationship between the corresponding pillow blocks of the two sets 212, 214 and, in turn, the rollers 114, 116 is varied as desired. By varying the pinch, that is, the distance between the rollers 114, 116, the penetration of the pistons 152 in their respective wells 150 is, likewise, varied.

Alternatively, the penetration of the 152 in their respective wells 150 may be varied by providing adjustable dies 152, 150. For example, the radial extension of the male dies 152 from the second roller 116 may be adjusted by varying the depth in which the same is threaded into the second roller 116. The lock nut 223 may be provided for ensuring that the male die 152 remains fixed relative to the second roller 116.

The rollers 114, 116 are driven in a contra-rotating direction by a suitable prime mover, such as the motor 224 shown, and power a transmitting element, which will be made clear in the following discussion. The first roller 114 carries a single pulley 226, the second roller 116 carries a tandem arrangement of pulleys 228, and the drive shaft of the motor 224 carries a single pulley 230. A first pulley 232 of the tandem arrangement of pulleys 228 is arranged in a coplanar relationship relative to the single pulley 226 carried by the first roller 114. A second pulley 234 of the tandem arrangement of pulleys 228 is arranged in a coplanar relationship relative to the single pulley 230 carried by the drive shaft of the motor 224.

A first belt 236 traverses the single pulley 226 carried by the first roller 114 and the first pulley 232 of the tandem arrangement of pulleys 228. A second belt 238 traverses the single pulley 230 carried by the drive shaft of the motor 224 and the second pulley 234 of the tandem arrangement of pulleys 228. The motor 224 is fixedly secured in a location a predetermined distance from the second roller 116. Upon energizing the motor 224, the second belt 238 rotates the second roller 116 in a counterclockwise direction and the first belt 236 is twisted, such as in the form of a figure eight, so as to rotate the first roller 114 in a contra-rotating direction relative to second roller 116, thus enabling the meshing engagement of the first and second rollers 114, 116.

It should be noted that the belt arrangement shown is for illustrative purposes and that other drive means may be employed, such as a chain drive or gear drive arrangement (not shown), or some combination thereof. Gilmer belts (also not shown) may be utilized to improve or ensure the proper timing of rotation of the roller 114, 116.

Now referring back to FIG. 1, the collector chute 118 and the slop catcher 120 are both oriented in a fixed position relative to the rollers 114, 116. The collector chute 118 is located beneath the first roller 114. An inlet opening 240 and an outlet opening 242 are bounded by four peripheral walls. The inlet opening 240 is elevated above the outlet opening 242 and the peripheral walls are structured and configured such that gravity effects fluid flow therethrough. The end of the peripheral walls bounding the outlet opening 242 are shaped to substantially conform to the cylindrical wall 132 of the first roller 114. The collector chute 118 is positioned such that the inlet opening 240 is within close contact with the first roller 114, extending along the longitudinal expanse of the roller 114 and about the roller 114, preferably from the six o'clock position to the nine o'clock position. The outlet opening 242 empties into a container 244.

The slop catcher 120 is positioned below both of the rollers 114, 116. The catch 120 includes an inlet opening 246 dimensioned to be at least coincident with the longitudinal extents of the rollers 114, 116 and to extend substantially from a longitudinal edge of the collector chute 118 to the cylindrical outer surface 190 of the second roller 116, thereby encompassing the area beneath the roller 114, 116.

The slop catcher 120 has a sloping bottom wall 248. An outlet end 250 of the catch 120 drains to a disposal site, or to be further processed.

In use, coal mixture $C_{In}$ is feed into the infeed end 122 of the hopper 112. The discharge end 130 of the hopper 112 substantially seats against the cylindrical wall 132 of the first roller 114 so as to substantially prevent coal mixture $C_{In}$ from escaping about and between the discharge end 130 of the hopper 112 and the cylindrical wall 132 of the first roller 114. In this way, the coal mixture $C_{In}$ is contained the hopper 112 until received by the wells 150. The coal mixture $C_{In}$ contained in the hopper 112 is continuously agitated by the vibratory device 126 or worm drive.

Upon energizing the motor 224, the rollers 114, 116 begin to rotate in a contra-rotating direction. As the rollers 114, 116 rotate, pistons 152 engage respective wells 150. The coal mixture $C_{In}$ received by the wells 150 is compressed as the pistons 152 and corresponding wells 150 pass through the pinch between the two rollers 114, 116, thus forming substantially demoisturized coal $C_{Out}$. As the rollers 114, 116 continue to rotate, the pusher assembly 170 comes into contact with the sled 184 and subsequently, urges the head 174 of the pusher assembly 170 toward the forward end 154 of the well 150. When the head 174 of the pusher assembly 170 is fully extended, the substantially demoisturized coal $C_{Out}$ are ejected into the collector chute 118. The collector chute 118 discharges the substantially demoisturized coal $C_{Out}$ into the container 244. Residual bi-product of the coal mixture $C_{In}$ is collected by the slop catcher 120 and drained to a disposal site, or further processed.

It is to be understood that the present invention is not limited to the sole embodiment described above, but encompasses any and all embodiments within the scope of the following claims.

We claim:

1. An apparatus for separating liquid and solid matter, the apparatus comprising:

a pair of contra-rotatable rollers including a first roller and a second roller, said first roller being provided with a female die and said second roller being provided with a male die, said female die being matingly engageable with said male die, said male die being adjustably attached to said second roller, said female die being releasably fastened to said first roller;

a prime mover; and a power transmitting element connected to said prime mover and to said pair of rollers.

2. The apparatus according to claim 1, wherein said first roller further comprises an ejection mechanism.

3. The apparatus according to claim 1, further including a hopper having a discharge end positioned adjacent said first roller.

4. The apparatus according to claim 3, wherein said hopper includes a vibrating mechanism.

5. The apparatus according to claim 3, wherein said hopper includes a grate and an access to said grate.

6. The apparatus according to claim 1, further including a solid matter collector positioned adjacent said first roller.

7. The apparatus according to claim 6, further including a liquid collector positioned adjacent said pair of rollers, said solid matter collector being dimensioned and configured to define a solid matter collecting area and said liquid collector being dimensioned and configured to define a liquid collecting area, the solid matter collecting area being separate from the liquid collecting area.

8. The apparatus according to claim 1, further including a liquid collector positioned adjacent said pair of rollers.

9. An apparatus for separating liquid and solid matter, the apparatus comprising:

a pair of contra-rotatable rollers including a first roller and a second roller, said first roller being provided with at least one female die and said second roller being provided with at least one male die, said at least one female die being matingly engageable with said at least one male die, said first roller further comprising an ejection mechanism, said at least one male die being adjustably attached to said second roller, said at least one female die being releasably fastened to said first roller;

a prime mover; and a power transmitting element connected to said primer mover and to said pair of rollers.

10. The apparatus according to claim 9, wherein said ejection mechanism includes:

at least one pusher assembly, and an actuation assembly, wherein said pusher assembly is attached to said female die, and wherein said actuation assembly is arranged and configured to intermittently contact and displace said pusher assembly upon a rotation of said first roller.

11. The apparatus according to claim 9, further including hopper having an infeed end and a discharge end, said discharge end being positioned below said infeed end and atop said first roller.

12. The apparatus according to claim 11, wherein said hopper includes a vibrating mechanism.

13. The apparatus according to claim 11, wherein said hopper includes a grate and an access to said grate.

14. The apparatus according to claim 9, further including a solid matter collector chute having an inlet opening and an outlet opening, said inlet opening being positioned above said outlet opening and below said first roller.

15. The apparatus according to claim 14, further including a liquid collector having an inlet opening positioned below said pair of rollers, said solid matter collector being dimensioned and configured to define a solid matter collecting area and said liquid collector being dimensioned and configured to define a liquid collecting area, the solid matter collecting area being separate from the liquid collecting area.

16. The apparatus according to claim 9, further including a liquid collector having an inlet opening positioned below said pair of rollers.

17. An apparatus for separating liquid and solid matter, the apparatus comprising:

a pair of contra-rotatable rollers including a first roller and a second roller, said first roller being provided with a plurality of female dies and said second roller being provided with a plurality of male dies, said first roller defining a cavity, each one of said female dies being matingly engageable with a corresponding one of said male dies, at least one of said female dies including a rear end having an opening therein, said first roller further comprises an ejection mechanism including:

at least one pusher assembly having a main body and a biasing element, said main body including a head and a rod connected to said head, said biasing element being carried by said rod, wherein said rod extends through said opening in said rear end of said at least on of said female dies and into said interior cavity of said first roller and said head is displaced within said at least one of said female dies, and an actuation assembly including an actuating assembly rod and an arcuate shaped sled connected to said actuating assembly rod, said actuating assembly rod being fixed relative to rotation of said first roller, wherein said actuation assembly is arranged and configured to intermittently contact and displace said pusher assembly upon rotation of said first roller;

a prime mover;

a power transmitting element connected to said prime mover and to said pair of rollers;

a hopper having a discharge end positioned adjacent said first roller;

a solid matter collector positioned adjacent said first roller; and a liquid collector positioned adjacent said pair of rollers.

18. The apparatus according to claim 17, further including means for adjustably fixing said actuating assembly rod relative to said first roller so as to enable said rod to be selectively rotated to one of a plurality of desired locations relative to said first roller.

19. The apparatus according to claim 17, further comprising a pusher assembly for each one of said female dies.

20. The apparatus according to claim 17, wherein said hopper includes a vibrating mechanism.

21. The apparatus according to claim 17, wherein said hopper includes a grate and an access to said grate.

22. The apparatus according to claim 17, wherein said solid matter collector is dimensioned and configured to define a solid matter collecting area and said liquid collector is dimensioned and configured to define a liquid collecting area, the solid matter collecting area being separate from the liquid collecting area.

* * * * *